(12) United States Patent
Hamel

(10) Patent No.: US 11,655,938 B1
(45) Date of Patent: May 23, 2023

(54) FLUID CATCHMENT ASSEMBLY

(71) Applicant: Clayton Hamel, Reston (CA)

(72) Inventor: Clayton Hamel, Reston (CA)

(*) Notice: Subject to any disclaimer, the term of this patent is extended or adjusted under 35 U.S.C. 154(b) by 0 days.

(21) Appl. No.: 17/853,858

(22) Filed: Jun. 29, 2022

(51) Int. Cl.
| | |
|---|---|
| *F16N 31/00* | (2006.01) |
| *F01M 11/00* | (2006.01) |
| *F01M 11/04* | (2006.01) |
| *F16N 19/00* | (2006.01) |
| *F01M 11/12* | (2006.01) |

(52) U.S. Cl.
CPC ....... *F16N 31/002* (2013.01); *F01M 11/0004* (2013.01); *F01M 11/0408* (2013.01); *F01M 11/12* (2013.01); *F16N 19/003* (2013.01); *F01M 2011/0416* (2013.01)

(58) Field of Classification Search
CPC .... F16N 31/002; F16N 19/003; F16N 31/006; F01M 11/0004; F01M 11/0408; F01M 11/12; F01M 2011/0416; F01M 2011/0095
See application file for complete search history.

(56) References Cited

U.S. PATENT DOCUMENTS

| | | | |
|---|---|---|---|
| 3,316,995 A | 5/1967 | Fay | |
| 3,651,884 A * | 3/1972 | Dorries | F16N 31/006 180/69.1 |
| 4,201,307 A | 5/1980 | Malloy | |
| 4,577,713 A | 3/1986 | Moon | |
| 5,501,290 A | 3/1996 | Volz | |
| 5,839,531 A * | 11/1998 | McGee | F16N 31/006 180/69.1 |
| D769,342 S | 10/2016 | Picazo | |
| 2001/0045324 A1 * | 11/2001 | Harding, Jr. | F16N 31/002 184/106 |

\* cited by examiner

*Primary Examiner* — Syed O Hasan

(57) ABSTRACT

A fluid catchment assembly for capturing fluids leaking from an internal combustion engine includes an oil pan structured to fit over a factory installed oil pan of an internal combustion engine thereby facilitating the oil pan to capture fluids that leak from the internal combustion engine. A sight glass is fluidly integrated into the oil pan thereby facilitating the sight glass to visually display a fluid level in the oil pan. A plug is insertable into the drain for closing the drain and a pair of attachments is each attached between the internal combustion engine and the oil pan. Each of the attachments releasably retains the oil pan on the internal combustion engine.

9 Claims, 5 Drawing Sheets

FLUID CATCHMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to catchment devices and more particularly pertains to a new catchment device for capturing fluid leaking from an internal combustion engine. The device includes an oil pan that is removably positionable over a factory installed oil pan on an internal combustion engine thereby facilitating the oil pan to capture fluids that leak from the internal combustion engine. The device includes a pair of attachments that each removably retains the oil pan on the internal combustion engine.

(2) Description of Related Art Including Information Disclosed Under 37 CFR 1.97 and 1.98

The prior art relates to catchment devices including a drip tray device for capturing fluids which drip from an engine and which includes a suction device. The prior art discloses a drip guard device comprises a panel that is suspended from an undercarriage of a vehicle for capturing drips. The prior art discloses a drip pan device that is mounted to a bottom of an internal combustion engine such that the drip pan completely covers the bottom of the internal combustion engine. The prior art discloses a drip pan device that includes a drip pan and a plurality of brackets each extending upwardly from the drip pan. The prior art discloses a drip guard device that includes a series of film panels that are attachable to an undercarriage of a vehicle. The prior art discloses a drip pad device that includes an oil absorbent panel that is suspended from a vehicle undercarriage.

BRIEF SUMMARY OF THE INVENTION

An embodiment of the disclosure meets the needs presented above by generally comprising an oil pan structured to fit over a factory installed oil pan of an internal combustion engine thereby facilitating the oil pan to capture fluids that leak from the internal combustion engine. A sight glass is fluidly integrated into the oil pan thereby facilitating the sight glass to visually display a fluid level in the oil pan. A plug is insertable into the drain for closing the drain and a pair of attachments is each attached between the internal combustion engine and the oil pan. Each of the attachments releasably retains the oil pan on the internal combustion engine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
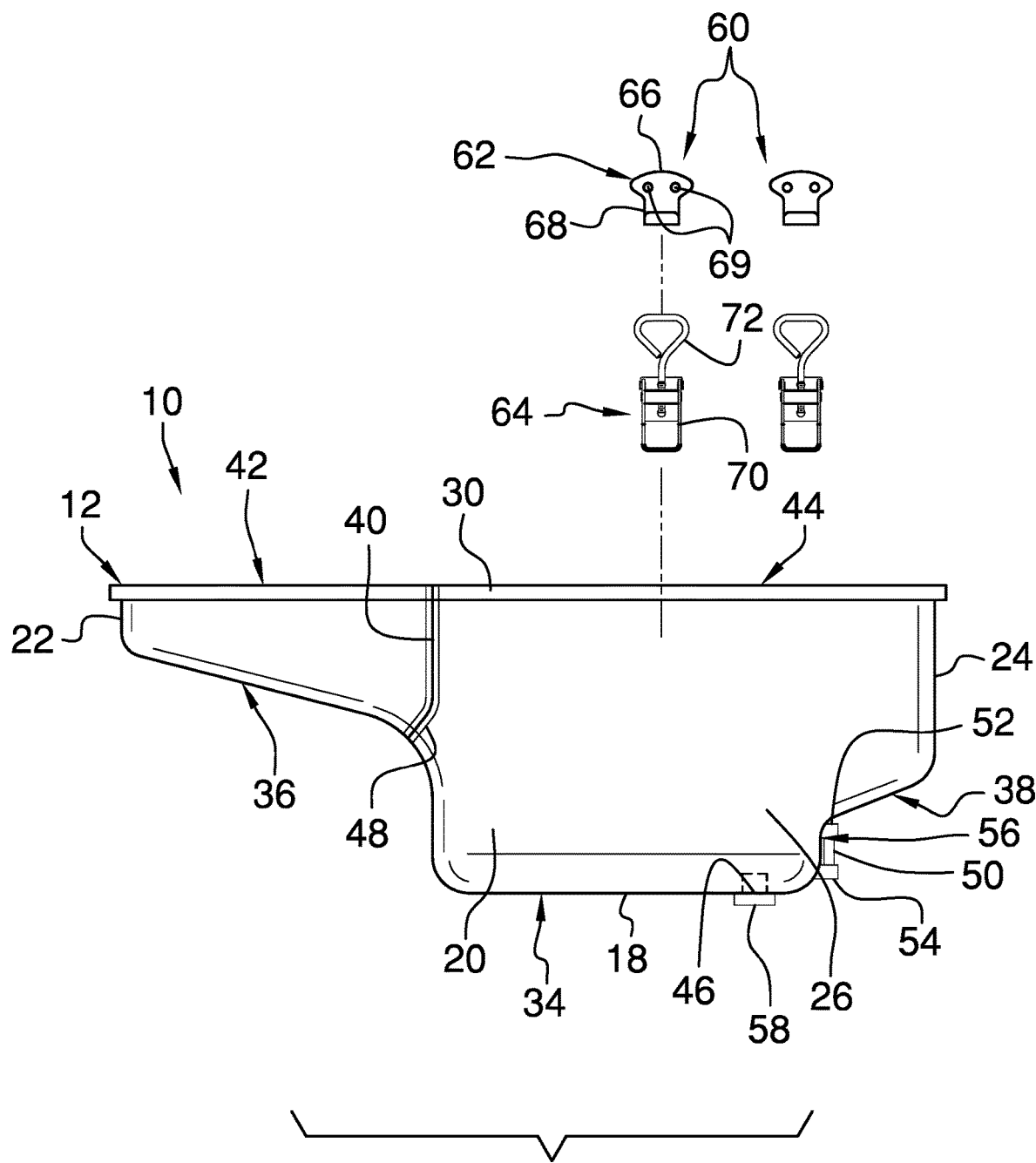
FIG. 1 is a right side view of a fluid catchment assembly according to an embodiment of the disclosure.
Figure 2:
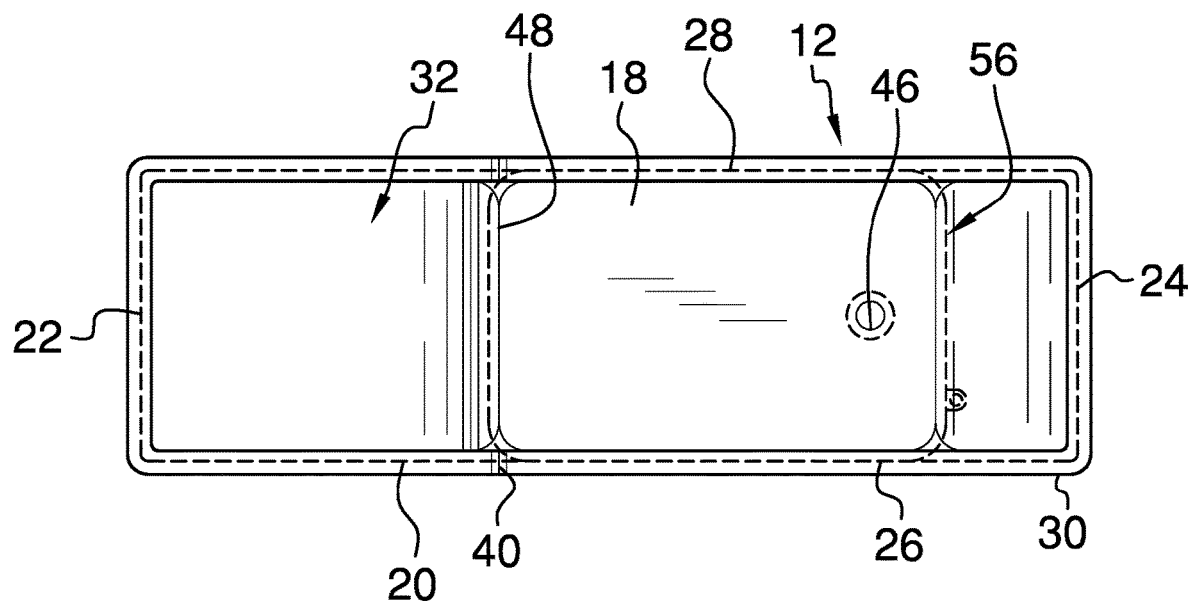
FIG. 2 is a top phantom view of an embodiment of the disclosure.
Figure 3:
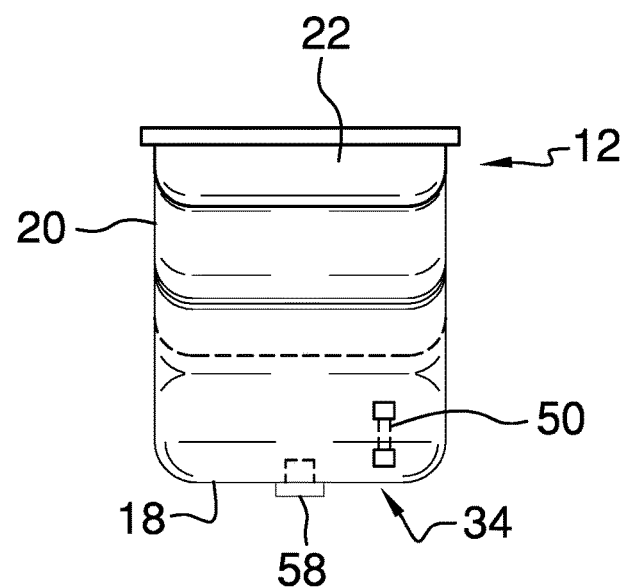
FIG. 3 is a front view of an embodiment of the disclosure.

With reference now to the drawings, and in particular to FIGS. 1 through 7 thereof, a new catchment device embodying the principles and concepts of an embodiment of the disclosure and generally designated by the reference numeral 10 will be described.

As best illustrated in FIGS. 1 through 7, the fluid catchment assembly 10 generally comprises an oil pan 12 structured to fit over a factory installed oil pan 14 of an internal combustion engine 16. In this way the oil pan 12 can capture fluids that leak from the internal combustion engine 16. The internal combustion engine 16 may be a diesel engine in a semi truck, a diesel engine in construction equipment or any other type of internal combustion engine that commonly leaks engine fluids, including but not being limited to, engine oil and engine coolant. Furthermore, the oil pan 12 is constructed to approximate the shape of the factory installed oil pan 14 on the internal combustion engine 16. The oil pan 14 is constructed of a fluid impermeable material, such as plastic or other lightweight material.

The oil pan 12 has a bottom wall 18 and an outer wall 20 extending upwardly from the bottom wall 18, and the outer wall 20 has a front side 22, a back side 24, a first lateral side 26, a second lateral side 28 and a distal edge 30 defining an opening 32 into the oil pan 12. The bottom wall 18 has a prominence 34 extending between the first lateral side 26 and the second lateral side 28 of the outer wall 20, and the prominence 34 defines a front portion 36 of the bottom wall 18 and a back portion 38 of the bottom wall 18. The front portion 36 intersects the front side 22 of the outer wall 20, the back portion 38 intersects the back side 24 of the outer wall 20, and the front side 22 has a height that is less than a height of the back side 24.

The oil pan 12 has a cut 40 extending through the outer wall 20 and the bottom wall 18 to define a front half 42 of the oil pan 12 and a back half 44 of the oil pan 12. The cut 40 extends along each of the first lateral side 26 and the second lateral side 28 of the outer wall 20, and the cut 40 is positioned closer to the back side 24 of the outer wall 20 than the front side 22 of the outer wall 20. The oil pan 12 has a drain 46 extending through the bottom wall 18 for draining the oil pan 12 and the drain 46 is positioned on the prominence 34. A gasket 48 is positioned between the front half 42 of the oil pan 12 and the back half 44 of the oil pan 12, and the gasket 48 extends along a full length of the cut 40. Additionally, the gasket 48 is comprised of a fluid impermeable material thereby inhibiting fluid from leaking through the cut 40.

A sight glass 50 is fluidly integrated into the oil pan 12 thereby facilitating the sight glass 50 to visually display a fluid level in the oil pan 12. The sight glass 50 has an upper end 52 and a lower end 54, and each of the upper end 52 and the lower end 54 is fluidly attached to a threshold 56 between the prominence 34 and the front portion 36 of the bottom wall 18. Furthermore, the sight glass 50 is oriented such that the sight glass 50 extends along a vertical axis when the oil pan 12 is mounted to the internal combustion engine 16. A plug 58 is provided and the plug 58 is insertable into the drain 46 for closing the drain 46.

A pair of attachments 60 is provided and each of the attachments 60 includes an engine portion 62 and an oil pan portion 64. The engine portion 62 of each of the attachments 60 is attached to the internal combustion engine 16 and the oil pan portion 64 of each of the attachments 60 is attached to the oil pan 12. The oil pan portion 64 of each of the attachments 60 releasably engages the engine portion 62 of a respective one of the attachments 60 for removably retaining the oil pan 12 on the internal combustion engine 16. The engine portion 62 of each of the attachments 60 includes a panel 66 and a hook 68 curving away from the panel 66, and the panel 66 has a pair of mounting holes 69 for receiving fasteners. The panel 66 is mounted to the internal combustion engine 16 such that the hook 68 curves away from the internal combustion engine 16.

The oil pan portion 64 of each of the attachments 60 includes a lever 70 and a grapple 72. The lever 70 associated with each of the attachments 60 is positioned on a respective one of the first lateral side 26 and the second lateral side 28 of the outer wall 20 of the oil pan 12. Additionally, the grapple 72 associated with the oil pan portion 64 of each of the attachments 60 engages the hook 68 associated with the engine portion 62 of a respective one of the attachments 60. The grapple 72 tightens against the hook 68 when the lever 70 is moved into a locking position thereby retaining the oil pan 12 on the internal combustion engine 16. Conversely, the grapple 72 loosens from the hook 68 when the lever 70 is moved into an unlocking position thereby facilitating the oil pan 12 to be removed from the internal combustion engine 16.

Figure 4:
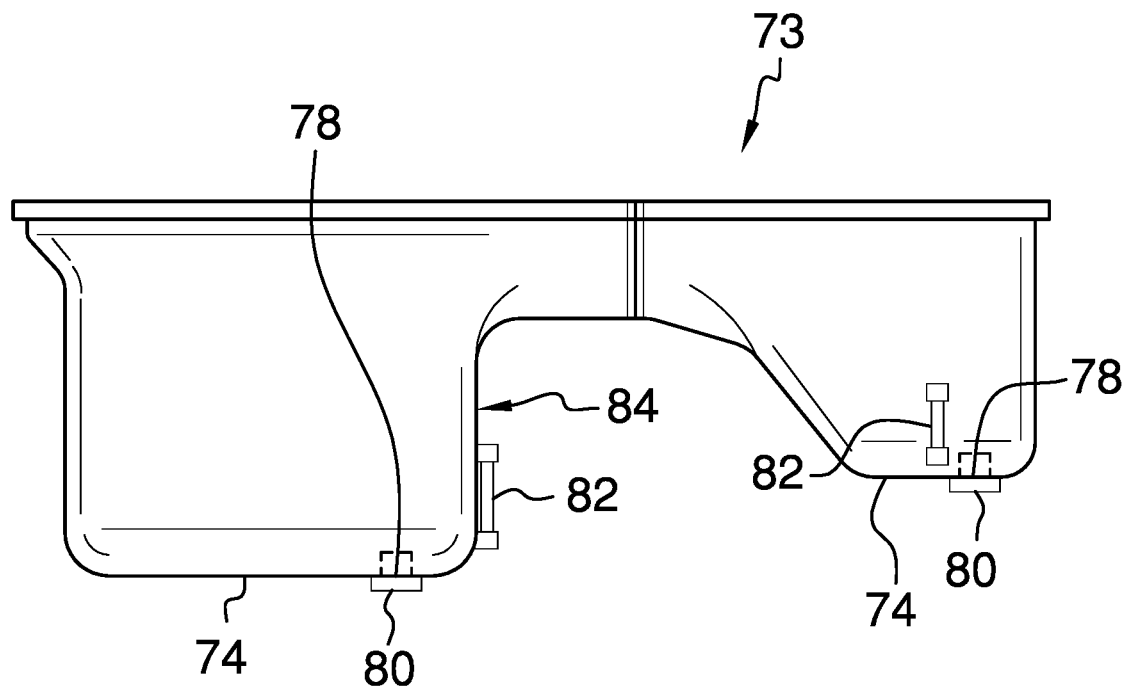
FIG. 4 is a left side view of an alternative embodiment of the disclosure.
Figure 5:
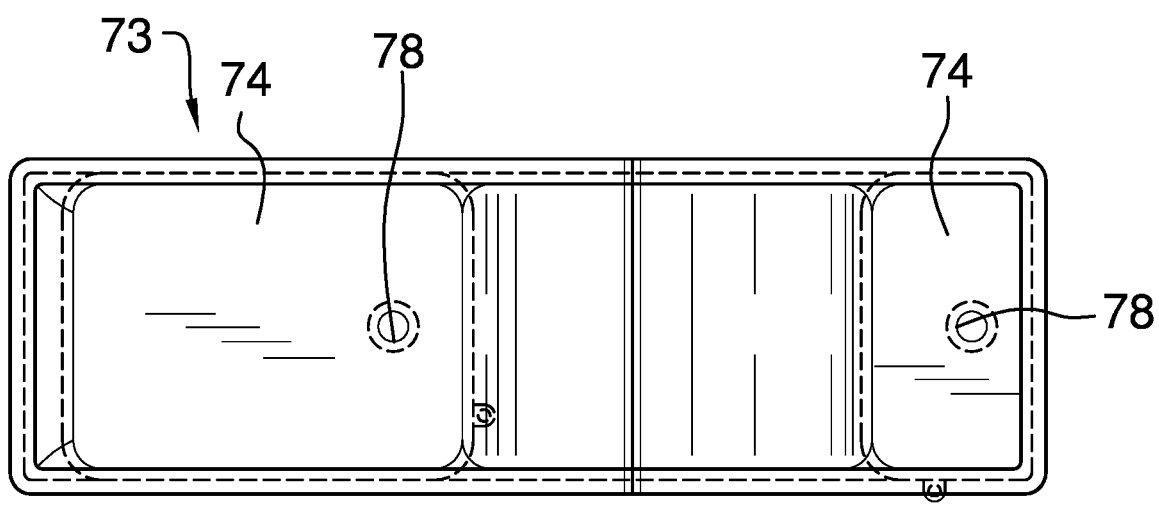
FIG. 5 is a top view of an alternative embodiment of the disclosure.
Figure 6:
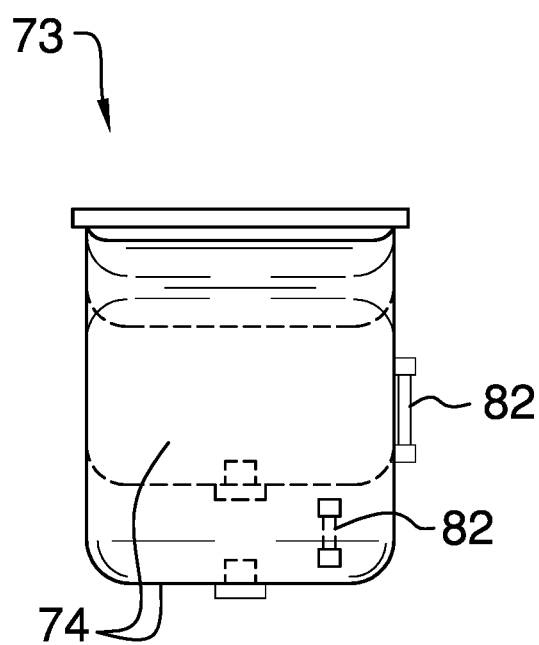
FIG. 6 is a front view of an alternative embodiment of the disclosure.
Figure 7:
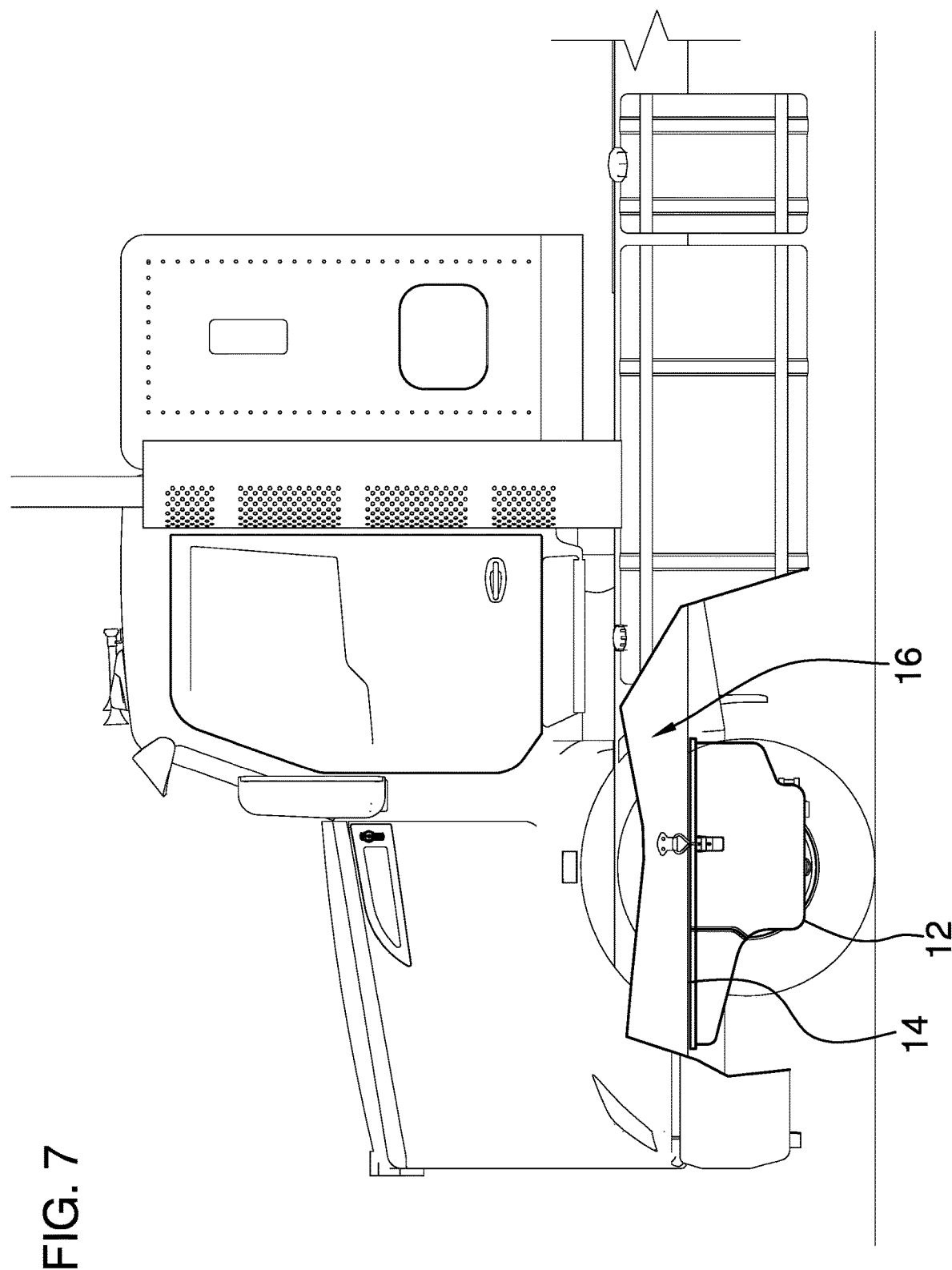
FIG. 7 is a perspective in-use view of an embodiment of the disclosure.

In an alternative embodiment 73 as is most clearly shown in FIGS. 4 through 6, the bottom wall 18 has a pair of prominences 74 each extending between the first lateral side 26 and the second lateral side 28 of the outer wall 20 of the oil pan 12. Each of the prominences 74 is aligned with a respective one of the front side 22 and the back side 24 of the outer wall 20 of the oil pan 12 to define a central portion 76 of the bottom wall 18 extending between the pair of prominences 74. Additionally, the cut 40 is aligned with the central portion 76 of the bottom wall 18.

Continuing in the alternative embodiment 73, the oil pan 12 has a pair of drains 78 each extending through the bottom wall 18 and each of the drains 78 is positioned on a respective one of the prominences 74. Additionally, a pair of plugs 80 is provided and each of the plugs 80 is insertable into a respective one of the drains 78 for closing the respective drain 78. A pair of sight glasses 82 is each positioned on respective one of the prominences 74 on the bottom wall 18. A respective one of the sight glasses 82 is positioned on a threshold 84 between the central portion 76 of the bottom wall 18 and the prominence 74 that is aligned with the front side 22 of the outer wall 20. Furthermore, a respective one of the sight glasses 82 is positioned on the first lateral side 26 of the outer wall 20 corresponding to the prominence 74 that is aligned with the back side 24 of the outer wall 20.

In use, the oil pan 12 is positioned over the factory installed oil pan 14 on the internal combustion engine 16 and each of the attachments 60 is manipulated to retain the oil pan 12 on the internal combustion engine 16. In this way the oil pan 12 captures any fluids that would otherwise leak onto the ground where a vehicle associated with the internal combustion engine 16 is parked. The sight glass 50 facilitates the fluid level in the oil pan 12 to be continuously monitored and the oil pan 12 can be drained at any time. Furthermore, the oil pan 12 can be removed at any time and for any reason.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fluid catchment assembly for containing fluids that leak from an internal combustion engine, said assembly comprising: an oil pan structured to fit entirely over a factory installed oil pan of an internal combustion engine thereby facilitating said oil pan to capture fluids that leak from the internal combustion engine; a sight glass being fluidly integrated into said oil pan thereby facilitating said sight glass to visually display a fluid level in said oil pan; a plug being insertable into a drain for closing said drain; a pair of attachments, each of said attachments including an engine portion and an oil pan portion, said engine portion of each of said attachments being attached to the internal combustion engine, said oil pan portion of each of said attachments being attached to said oil pan, said oil pan portion of each of said attachments releasably engaging said engine portion of a respective one of said attachments for removably retaining said oil pan on the internal combustion engine; wherein: said oil pan has a bottom wall and an outer wall extending upwardly from said bottom wall, said outer wall having a front side, a back side, a first lateral side, a second lateral side and a distal edge defining an opening into said oil pan, said bottom wall having a prominence extending between said first lateral side and said second lateral side of said outer wall, said prominence defining a front portion of said bottom wall and a back portion of said bottom wall, said front portion intersecting said front side of said outer wall, said back portion intersecting said back side of said outer wall, said front side having a height being less than a height of said back side; said oil pan has a cut extending through said outer wall and said bottom wall to define a front half of said oil pan and a back half of said oil pan, said cut extending along each of said first lateral side and said second lateral side of said outer wall, said cut being positioned closer to said back side of said outer wall than said front side of said outer wall; and said oil pan has said drain extending through said bottom wall for draining said oil pan, said drain being positioned on said prominence.

2. The assembly according to claim 1, further comprising a gasket being positioned between said front half of said oil pan and said back half of said oil pan, said gasket extending along a full length of said cut, said gasket being comprised of a fluid impermeable material thereby inhibiting fluid from leaking through said cut.

3. The assembly according to claim 1, wherein said sight glass has an upper end and a lower end, each of said upper end and said lower end being fluid attached to a threshold between said prominence and said front portion of said bottom wall, said sight glass being oriented such that said sight glass extends along a vertical axis when said oil pan is mounted to the internal combustion engine.

4. A fluid catchment assembly for containing fluids that leak from an internal combustion engine, said assembly comprising: an oil pan structured to fit entirely over a factory installed oil pan of an internal combustion engine thereby facilitating said oil pan to capture fluids that leak from the internal combustion engine; a sight glass being fluidly integrated into said oil pan thereby facilitating said sight glass to visually display a fluid level in said oil pan; a plug being insertable into a drain for closing said drain; a pair of attachments, each of said attachments including an engine portion and an oil pan portion, said engine portion of each of said attachments being attached to the internal combustion engine, said oil pan portion of each of said attachments being attached to said oil pan, said oil pan portion of each of said attachments releasably engaging said engine portion of a respective one of said attachments for removably retaining said oil pan on the internal combustion engine, wherein: said engine portion of each of said attachments includes a panel and a hook curving away from said panel, said panel having a pair of mounting holes for receiving fasteners, each of panel being mounted to the internal combustion engine such that said hook curves away from the internal combustion engine; and said oil pan portion of each of said attachments includes a lever and a grapple, said lever associated with each of said attachments being positioned on a respective one of said first lateral side and said second lateral side of said outer wall of said oil pan.

5. The assembly according to claim 4, wherein said grapple associated with said oil pan portion of each of said attachments engages said hook associated with said engine portion of a respective one of said attachments, said grapple tightening against said hook when said lever is moved into a locking position thereby retaining said oil pan on the internal combustion engine, said grapple loosening from said hook when said lever is moved into an unlocking position thereby facilitating said oil pan to be removed from the internal combustion engine.

6. A fluid catchment assembly for containing fluids that leak from an internal combustion engine, said assembly comprising:
  an oil pan structured to fit over a factory installed oil pan of an internal combustion engine thereby facilitating said oil pan to capture fluids that leak from the internal combustion engine, said oil pan having a bottom wall and an outer wall extending upwardly from said bottom wall, said outer wall having a front side, a back side, a first lateral side, a second lateral side and a distal edge defining an opening into said oil pan, said bottom wall having a prominence extending between said first lateral side and said second lateral side of said outer wall, said prominence defining a front portion of said bottom wall and a back portion of said bottom wall, said front portion intersecting said front side of said outer wall, said back portion intersecting said back side of said outer wall, said front side having a height being less than a height of said back side, said oil pan having a cut extending through said outer wall and said bottom wall to define a front half of said oil pan and a back half of said oil pan, said cut extending along each of said first lateral side and said second lateral side of said outer wall, said cut being positioned closer to said back side of said outer wall than said front side of said outer wall, said oil pan having a drain extending through said bottom wall for draining said oil pan, said drain being positioned on said prominence;
  a gasket being positioned between said front half of said oil pan and said back half of said oil pan, said gasket extending along a full length of said cut, said gasket being comprised of a fluid impermeable material thereby inhibiting fluid from leaking through said cut;
  a sight glass being fluidly integrated into said oil pan thereby facilitating said sight glass to visually display a fluid level in said oil pan, said sight glass having an upper end and a lower end, each of said upper end and said lower end being fluid attached to a threshold between said prominence and said front portion of said bottom wall, said sight glass being oriented such that said sight glass extends along a vertical axis when said oil pan is mounted to the internal combustion engine;
  a plug being insertable into said drain for closing said drain; and
  a pair of attachments, each of said attachments including an engine portion and an oil pan portion, said engine portion of each of said attachments being attached to the internal combustion engine, said oil pan portion of each of said attachments being attached to said oil pan, said oil pan portion of each of said attachments releasably engaging said engine portion of a respective one of said attachments for removably retaining said oil pan on the internal combustion engine, said engine portion of each of said attachments includes a panel and a hook curving away from said panel, said panel having a pair of mounting holes for receiving fasteners, each of panel being mounted to the internal combustion engine such that said hook curves away from the internal combustion engine, said oil pan portion of each of said attachments includes a lever and a grapple, said lever associated with each of said attachments being positioned on a respective one of said first lateral side and said second lateral side of said outer wall of said oil pan, said grapple associated with said oil pan portion of each of said attachments engaging said hook associated with said engine portion of a respective one of said attachments, said grapple tightening against said hook when said lever is moved into a locking position thereby retaining said oil pan on the internal combustion engine, said grapple loosening from said hook when said lever is moved into an unlocking position thereby facilitating said oil pan to be removed from the internal combustion engine.

7. The assembly according to claim 6, wherein said bottom wall has a pair of prominences each extending between said first lateral side and said second lateral side of said outer wall of said oil pan, each of said prominences being aligned with a respective one of said front side and said back side of said outer wall of said oil pan to define a central portion of said bottom wall extending between said pair of prominences, said cut being aligned with said central portion of said bottom wall.

8. The assembly according to claim 7, wherein:
said oil pan has a pair of drains each extending through said bottom wall, each of said drains being positioned on a respective one of said prominences; and
said assembly includes a pair of plugs each being insertable into a respective one of said drains for closing said respective drain.

9. The assembly according to claim 7, further comprising a pair of sight glasses, a respective one of said sight glasses being positioned on a threshold between a respective one of said prominences and said central portion of said bottom wall, a respective one of said sight glasses being positioned on said first lateral side of said outer wall corresponding to said prominence being aligned with said back side of said outer wall.

* * * * *